United States Patent Office 3,426,733
Patented Feb. 11, 1969

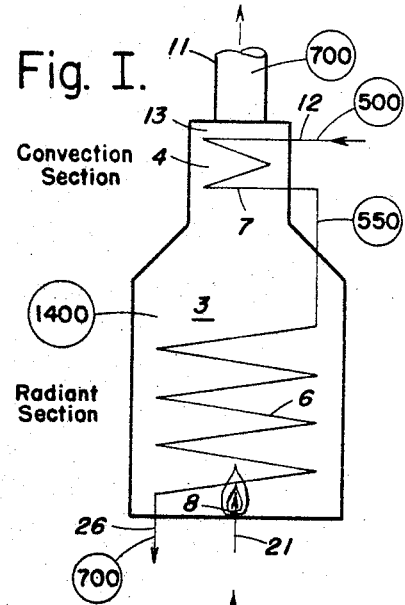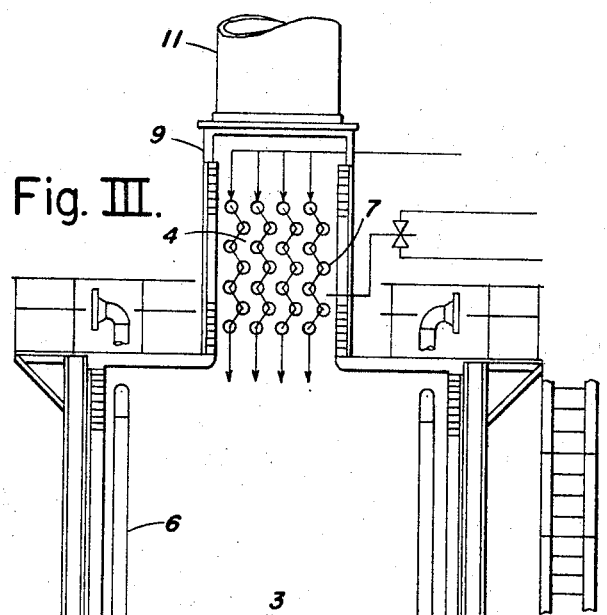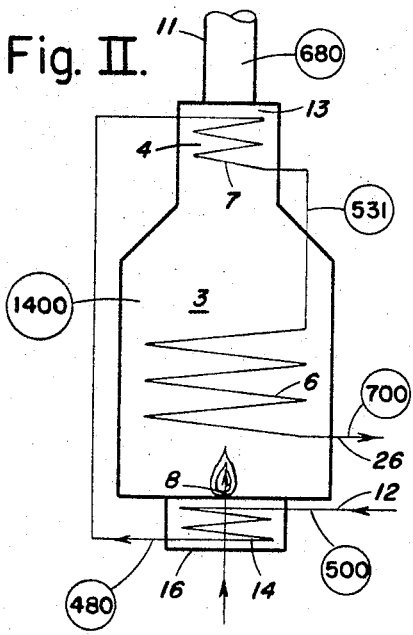

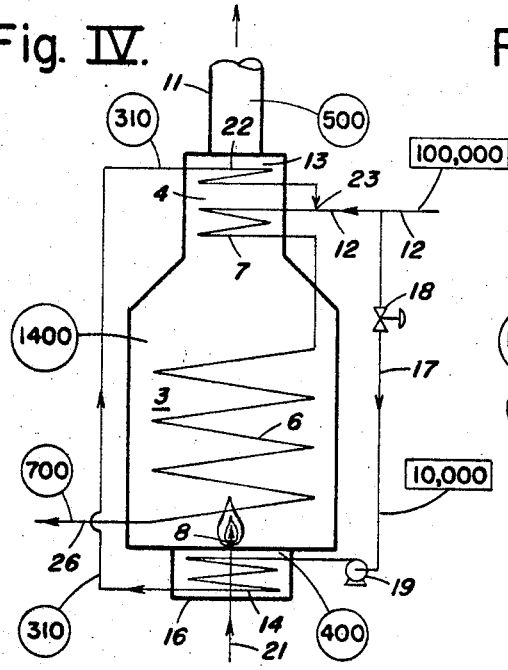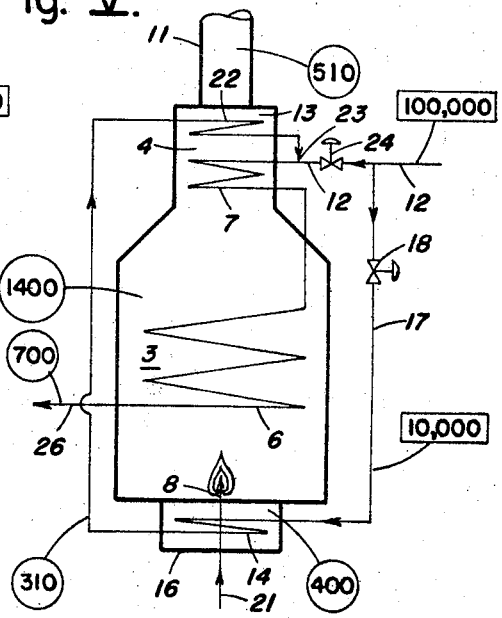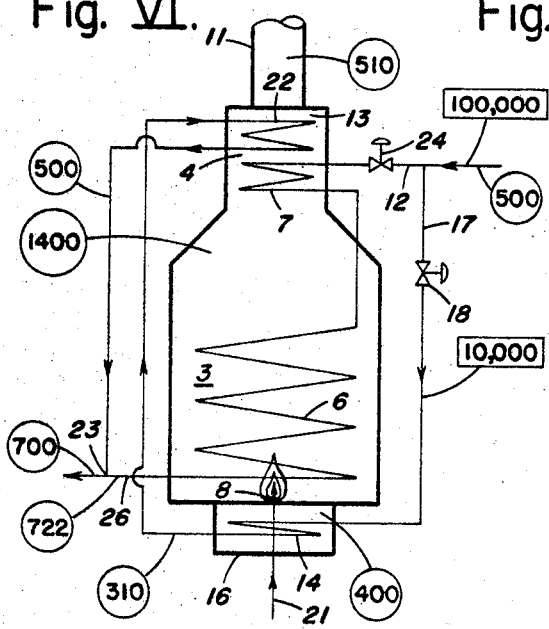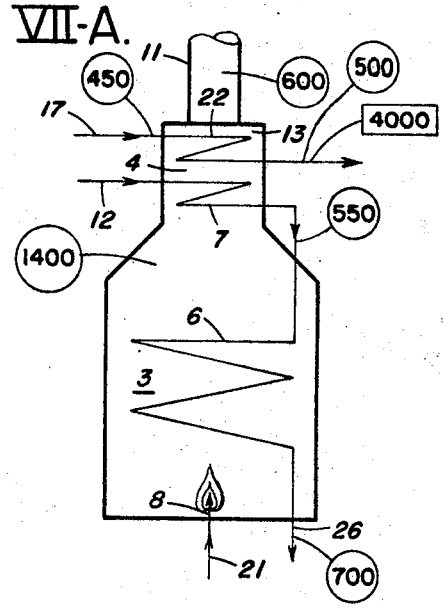

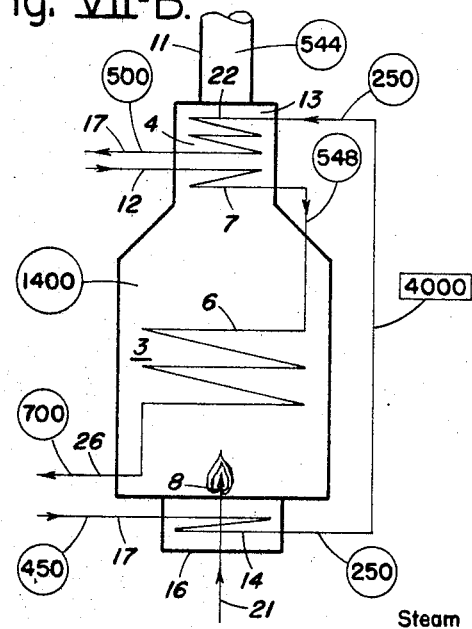
Fig. VII-B.
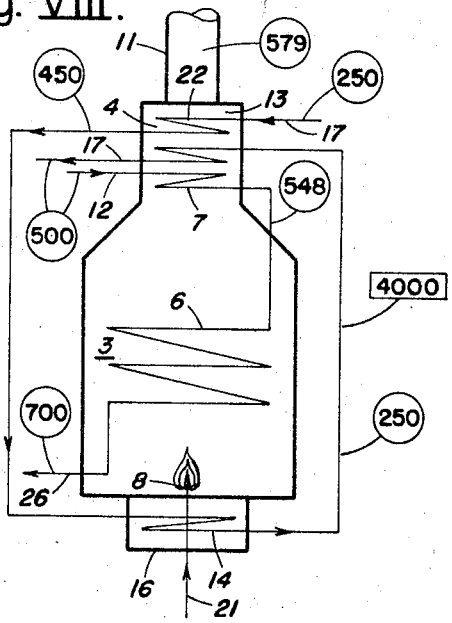
Fig. VIII.
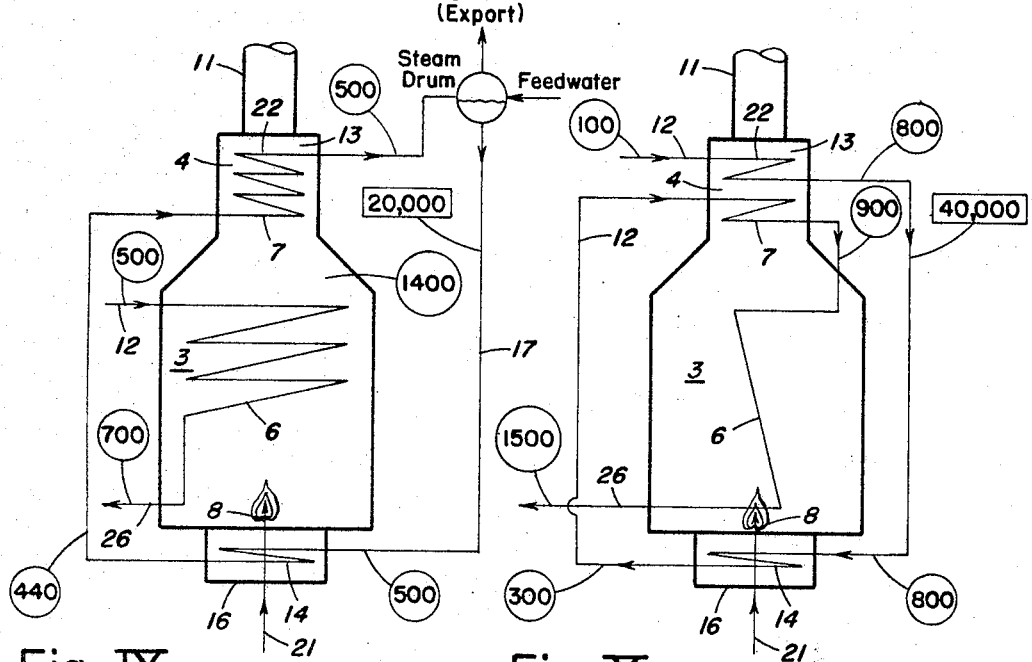
Fig. IX.
Fig. X.

3,426,733
FURNACE AND RELATED PROCESS INVOLVING COMBUSTION AIR PREHEATING
Peter von Wiesenthal, 17 E. 89th St.,
New York, N.Y. 10028
Filed Sept. 19, 1967, Ser. No. 668,860
U.S. Cl. 122—1                     11 Claims
Int. Cl. F22d 33/04, 37/12

ABSTRACT OF THE DISCLOSURE

This disclosure relates to furnaces. The invention teaches the use of an auxiliary stream at super-ambient temperature for heat donation to combustion air and subsequent heat collection from flue gases in order that overall thermal efficiency of the furnace may be improved. The auxiliary stream can be a slip stream or an independent service so long as it is not a closed loop. According to this teaching fuel economy and overall efficiency are promoted at a much lower cost than would be incident to conventional air preheating systems.

BACKGROUND

Furnaces are one of the major classes of equipment throughout the process industries and more particularly in chemical and petroleum refining plants. Typically such furnaces comprise settings which define combustion chambers furnished with one or more burners to fire fuel with combustion air therein. Radiant coils are mounted in the combustion chambers to receive heat essentially by means of radiant heat transfer. Thereafter combustion gases are delivered to convection sections which are usually also defined by the settings and which have convection coils mounted therein to receive heat from the combustion gases essentially by means of convective heat transfer. From the convection sections the combustion gases are vented to a stack.

For a furnace with a given fuel input, efficiency depends upon how much of the heat released from the fuel can be recovered. Stated differently, efficiency is an inverse function of flue gas temperature. One approach toward reducing stack temperature is to use the flue gas to preheat combustion air for the burners. This preheating may be accomplished by well known heat exchangers, wherein for example the combustion air is passed on the tube side of a tube and shell exchanger and the flue gas is passed on the shell side (or vice versa) for non-contact heat exchange one with the other. It is also well known to preheat air in regenerative heat exchangers wherein a heat storage mass is contacted alternately with the flue gas for heat collection and then with the combustion air for heat donation. Preheating of combustion air yields high efficiencies and has the added advantage of reducing fuel costs since it becomes unnecessary to heat the combustion air from ambient temperature all the way up to the operating combustion temperature of the unit.

Unfortunately there must be superimposed on the consideration of efficiency at least the added test of economic justification wherein a comprise must be reached between initial cost and operating cost. It is frequently possible to justify greater initial costs by reducing operating costs, but each furnace installation must usually stand on its own merits. By way of comparison, in a utility boiler installation it is quite common to use regenerative air preheaters, because their cost can almost always be justified. For major petroleum refining furnaces in well balanced services it is uncommon to find either regenerative or indirect air preheaters. As smaller furnaces are considered or as services tend toward inbalance (services such as catalytic hydrocarbon reforming pyrolysis or the like) air preheaters per se get even less attractive.

One explanation for the decrease of attractiveness as the size of furnace reduces is that the cost of air preheaters does not go down with size as rapidly as furnace cost. Tube and shell fabrication generally has a much higher labor/material cost ratio than does furnace construction. The same is true for regenerative air preheaters and this situation is aggravated because motors, moveable parts and seals are also included in regenerative air preheaters. Another drawback to conventional air preheating systems has been the geometric difficulties encountered in moving substantial quantities of gases through large ducts by means of fans.

At this point it should also be mentioned that even where air preheating would normally be justifiable, it must still compete with other demands on a plant's capital budget. Frequently other alternate expenditures can be shown to produce a faster payout on invested capital than can conventional air preheating.

Even where conventional air preheating satisfies all applicable economic criteria, this approach may still be objectionable from a reliability point of view. Indirect heat exchangers are vulnerable to corrosion from acid flue gases. Regenerative air preheating systems include blowers, drives, seals and miscellaneous other equipment. Failure of any one of several elements extrinsic to the process stream can put such a system out of commission. For this reason, plants are frequently reluctant to risk shutdowns. This situation contrasts with a utility boiler installation where there are ready alternatives available in the event a unit goes off the line.

Accordingly where ordinary air preheaters are not feasible in furnace installations, both the opportunity for higher overall thermal efficiency and the opportunity to save on fuel are lost. Forfeiture of these opportunities presents a serious frustration to furnace designers and penalizes such installations. Without air preheating the combustion air must be raised all the way from its ambient temperature to the temperature of the radiant section thereby consuming fuel. Also the limit in the convection section on heat recovery from the flue gases is the temperature of the incoming process stream to be heated. The flue gas temperature must obviously be above the temperature of the incoming process stream to affect any reasonable heat input thereto. This temperature differential between incoming process stream temperature and the leaving flue gas is seldom below 100° F. and practically never below 50° F. in normal applications.

When an air preheater is not included, furnace designers have resorted to loops circulating a heat transfer fluid in noncontact heat exchange relationship first with the flue gas for heat collection and then to the combustion air for heat donation. The heat transfer fluids thus employed including eutectic mixtures of potassium and sodium salts, eutectic mixtures of diphenyl and diphenyloxide, o-dichlorobenzene, aromatic heat transfer oils, tetrachlorobiphenyl compounds and the like. The inherent difficulty in these systems was that the loops were closed. Any inbalance between heat collection from the flue gases and heat donation to the combustion air became magnified. If heat collection from the flue gases proceeded at too low a rate the preheating of combustion air progressively became so low that fuel savings were not possible. If the rate of heat collection from the flue gases was too high the temperature of the heat transfer fluid rose progressively to the extent that heat collection from the flue gases was inadequate and consequently efficiency suffered. Other problems associated with these loops included the provision for expansion of the heat transfer fluid by means of surge tanks or the like. Also, if there was any malfunction of the system (such as a pump failure) then the entire loop had to be drained promptly thereby requiring storage facilities for the heat transfer fluid.

Most process streams being delivered to furnaces are at temperatures substantially above ambient. Accordingly another solution attempted by this inventor was to first transfer heat from the incoming process fluid to the combustion air, thereby preheating the combustion air for fuel savings and reducing the temperature of the process fluid so that it could be used to collect more heat from the flue gas thereby increasing efficiency. Logically this approach was appealing, but it was found that the amount of heat donated by the process fluid in heating the combustion air would not reduce the temperature of that process fluid sufficiently to provide stack temperatures low enough to recover the heat put into the combustion air. Though the combustion air was preheated the equivalent heat could not be recovered from the flue gases. The net result was that for the same efficiency as in a conventional system, more fuel rather than less fuel had to be consumed.

After many years of dedicated effort, this inventor has now solved the foregoing problem. Mr. Von Wiesenthal does not use the full process stream for preheating combustion air, but rather he uses a lesser stream here called the auxiliary stream. The relationship of combustion air flow to the flow of the auxiliary stream is organized to take into account their respective temperature change requirements and specific heats. The temperature of the auxiliary stream is reduced approximately at the same rate that the combustion air is preheated. Then the auxiliary stream is reduced to a temperature level such that it can regain heat from the flue gases sufficient to restore its initial temperature level. Substantially all of the heat donated to the combustion air is regained from the flue gases and the flue gas temperature is correspondingly lowered for attractive overall thermal efficiency of the furnace.

Basically this teaching offers air preheating at a much lower cost than prior systems of its kind. This system is part of the furnace installation so fabrication costs are low. Further, there is no loss of combustion air as is the case in regenerative air preheaters. Reliability is assured because this system operates at less critical temperatures and under less severe conditions than does the process stream and also because it depends on no more mechanical equipment than valves and pumps. This air preheating system can operate as long as the furnace is on the line. But more than these, the present advance adds an entirely new dimension to overall plant economies.

It should also be noted that by varying the flow rate of the auxiliary stream going to the combustion air preheater coil, the amount of air preheating and the temperature to which the auxiliary stream is cooled can be controlled practically at will. A furnace manufacturer is enabled to optimize the efficiency of any furnace, particularly where heat duty, fuel or other design parameters do not live up to his original expectations. Plant operators are enabled to adjust to change. Also when modifications of plants are contemplated the present advance again comes into play with all due credits.

DESCRIPTION OF DRAWINGS

The foregoing and other advantages will appear more fully from the accompanying drawings which show key temperatures (° F.) in circles and flow rates (pounds per hour in boxes) and wherein:

FIGURE I is an idealized representation of a conventional process heater which should be familiar to those connected with heat transfer.

FIGURE II illustrates a heater with its entire process stream being employed for air preheating. Comparative figures are shown in FIGURES I and II for thermal efficiency, heat absorption and heat input.

FIGURE III is a sectional elevation view of a typical furnace in which the present invention has its situs.

FIGURE IV shows a heater according to this invention with an auxiliary stream used for air preheating and pressurized by means of a pump.

FIGURE V defines another variation of a heater according to this invention with flow through the process stream and the auxiliary stream regulated by valves.

FIGURE VI presents another embodiment of this invention with the auxiliary stream rejoining the process stream after both streams have left the heater.

FIGURES VII-A and VII-B teach a furnace where more than one service is being heated and where only one of the services is subjected to radiant heat. In FIGURE VII-A no air preheating is employed. In FIGURE VII-B one of the services is used for air preheating prior to its introduction into the convection coil.

FIGURE VIII is comparable to FIGURE VII-B except that the temperature of the auxiliary stream is boosted before it is used in air preheating service.

FIGURE IX depicts this invention applied to a stream economizer system and teaches the adaptation of the system for air preheating.

FIGURE X relates to pyrolysis or reformer furnaces wherein the process streams can be used for air preheating. This is made possible because of perculiar heat transfer relationships incident to these designs.

The various examples set forth at the end of this specification are keyed to these figures and are intended to illustrate the differences therebetween.

PREFERRED EMBODIMENT

The present invention has application in a wide variety of furnaces. For illustrative purposes a typical vertical cylindrical refinery furnace is shown in FIGURE III. Although a vertical cylindrical design is here shown, it will be apparent that this invention applies also to cabinet or box-type furnaces of a wide variety of sizes and services throughout the process industries.

Setting 1 is supported by steel frame 2 and encloses radiant section 3 and convection section 4. Convection section 4 is typically a box-like arrangement which sits atop the radiant section. The radiant coil 6 may be fired from one side or both sides. Extended surface is usually provided on the convection coil 7 where the gas temperatures are sufficiently low. Burners 8 fire fuel with air to introduce hot combustion gases into radiant section 3 and for exit via convection section 4. The hot combustion gases are collected by means of a hood 9 and are vented through stack 11.

As seen in FIGURE I, one or more process streams 12 is circulated in series through convection coil 7 and then through radiant coil 6. As has been pointed out, the limiting condition for efficiency of these heaters is the temperature of the incoming process streams. The level of flue gas temperature which can be achieved at 13 is directly related to the temperature of the incoming process stream. This is because the incoming process stream can only cool the flue gas down to its own temperature.

As shown in FIGURE II it was attempted to preheat combustion air by using the incoming process stream 12. Toward this objective an air preheat coil 14 was mounted in enclosure 16. This approach was unsuccessful as it was found that the amount of heat taken from process stream 12 in heating the combustion air did not reduce the temperature of that process stream sufficiently to provide adequate flue gas temperature reduction at 13. This system was unable to recover in convection section 4 the equivalent of the heat that was put into the combustion air. Hence though the air was preheated, convection coil 7 could not regain the heat because the process stream temperature had not been sufficiently lowered. As seen from the comparison data set forth on FIGURES I and II, the net result of the foregoing approach was that to obtain approximately the same duty with air preheating from the process stream, more fuel rather than less fuel was required.

At the core of this invention is the use of only a portion of process stream 12 or its equivalent to preheat combustion air. This is illustrated in FIGURE IV wherein auxiliary stream 17 is divided from process stream 12. Auxiliary stream 17 is controlled by valve 18 and pressurized by pump 19. This auxiliary stream is circuated in non-contact heat exchange relationship with combustion air 21 by means of air preheat coil 14 and is subsequently cycled in convection economizer coil 22 for collection of heat from flue gases before reentry into process stream 12 at 23. Process stream 12 courses through the furnace in the usual manner. All of the heat given up to the combustion air in air preheater coil 14 (and more) can be recovered in convection economizer coil 22 and the flue gas temperature at 13 can be correspondingly lowered for greater overall thermal efficiency of the unit.

By varying the flow rate of auxiliary stream 17, the amount of air preheating achieved and the temperature reduction of auxiliary stream 17 can be varied practically at will. The ability to make these adjustments is of considerable importance in optimizing the efficiency of any given furnace, particularly where that furnace is subjected to fluctuations in duty, ambient conditions or other parameters.

Several alternate arrangements are available, from a process point of view, to control flow in process stream 12 and auxiliary stream 17. In the case shown in FIGURE IV auxiliary stream 17 has its pressure raised by means of pump 19. The pump is used to overcome hydraulic resistance in the air preheat coil 14 and in convection economizer coil 22. This auxiliary stream would generally be flow controlled by means of valve 18 or some other suitable device. Another technique for flow control is shown in FIGURE V. Pump 19 of FIGURE IV is dispensed with and valves 18 and 24 are provided in auxiliary 17 and process 12 streams respectively.

A further possible arrangement shown in FIGURE VI is to reintroduce auxiliary stream 17 into process stream 12 at outlet 26 of the furnace to integrate the total flow. Obviously in this design the temperature level of process stream 12 at furnace outlet 26 would have to be increased slightly to achieve a desired net mix temperature. The advantage of this arrangement is a saving in fluid pressure drop. The pressure drop in process stream 12 is usually greater than that of auxiliary stream 17. Generally no pump is needed in this arrangement and for most typical installations only some form of control such as valves 18 and 24 would be necessary on process stream 12 and auxiliary stream 17 respectively.

It should be borne in mind that air preheat coil 14 need not be located immediately adjacent burners 8. Some form of ducting might be desirable for layout convenience. In addition, it will be understood by those familiar with furnace design that fans could be used to pressurize the combustion air thereby effecting economies in sizing air preheat coil 14.

Experts in furnace design will also appreciate that variations of this invention can find application in modified forms. One important variation is a furnace where more than one service is to be heated and one of these services can act as auxiliary stream 17.

As shown in FIGURE VII–B it is not essential to the present teaching that either or both process stream 12 and auxiliary stream 17 be subjected to radiant heating. In the embodiment of FIGURE VII–B which is developed from the conventional set up of VII–A, auxiliary stream 17 is heated by means of convection heat transfer only. It should also be understood that this air preheating could be easily adapted to an all-convection furnace.

As shown in FIGURE VIII, when the incoming temperature of the auxiliary stream 17 is too low for effective air preheating, it is possible to preheat auxiliary stream 17 in a convection economizer coil 22 so as to make the stream effective for air preheating in coil 14 and then have it available for further service in reducing flue gas temperatures at 13 to yield improved overall furnace efficiency. Feedwater heating services or steam superheater services are typical examples of the applications contemplated in FIGURE VIII. In many typical installations these services are superimposed on a basic furnace design to improve efficiency, but frequently it has been found that the process duty required by these separate services either varies too much or is insufficient to really produce the desired optimization. The difference between the embodiment shown in FIGURE VIII and a pump-around loop with an intermediate heat transfer fluid is that in FIGURE VIII auxiliary stream 17 gets exported so that possible inbalances do not become magnified.

In many furnace applications, such as the one shown in FIGURE IX, steam generation is used to boost furnace efficiency. The amount of fuel burned by such units; however, is a function of radiant duty and radiant efficiency. Steam generation would merely extract more heat from whatever amount fuel is being burned. Air preheating, on the other hand, by extracting heat from the flue gases at 22 for preheating the combustion air at 14, reduces the amount of fuel which must be burned. Frequently it could be advantageous to limit steam generation and increase fuel efficiency by utilizing air preheating. In the variation of this invention set forth in FIGURE IX an auxiliary stream of water 17 at saturated temperature is used to preheat combustion air.

A further important variation of this invention occurs in heaters wherein the amount of process flow is small in relation to furnace duty. This is typically the case in furnaces for a number of commercially important endothermal conversions which proceed at appreciable rates only when elevated temperatures are reached. For example, steam pyrolysis of vaporous hydrocarbons to produce olefins is normally conducted at temperatures of 1100° F. to 1600° F. Catalytic reforming in the presence of hydrogen to improve octane normally proceeds at temperatures in the vicinity of 900° F. In the case of catalytic steam reforming of a hydrocarbon to produce hydrogen and carbon monoxide, temperatures well in excess of 1000° F. are required. The radiant chambers of these units run as low as 40% efficiency, so obtaining reasonable overall efficiency values becomes a major design problem. If steam powered turbines are employed in these plants, large steam generation coils can be set up in the convection sections to improve overall efficiency. In any event these units still generally have convection section capacity to spare. For these cases as shown in FIGURE X the process stream after being preheated in the convection section, is used for preheating the combustion air at 14 and the process stream is then reheated in convection coil 7 prior to entering radiant coil 6. The inventor suggests that this approach has important merit, particularly on small, steam-hydrocarbon reforming units or even on large units when use of steam-driven auxiliary equipment is not practical.

The following examples relate to the figures of the accompanying drawings. In all cases except case X the following controlling conditions prevail:

*Controlling conditions*

| | |
|---|---|
| Main process flow | 100,000 #/hr. |
| Specific heat | 0.5 B.t.u./# ° F. |
| Temp. rise | 200° F. |
| Main process duty | 10,000,000 B.t.u./hr. |
| Combustion air | 950 #/MM B.t.u. at 0.25 B.t.u./# ° F. |
| Flue gas | 1000 #/MM B.t.u. at 0.275 B.t.u./# ° F. |
| Firebox temp. | 1400° F. |
| Economical temp. approach | Convection section 200° F. Windbox 100° F. |
| Auxiliary stream | 0.5 B.t.u./# ° F. |

Example I

| | |
|---|---|
| Process stream heat absorption, B.t.u./hr. | 10,000,000 |
| Furnace heat loss | 300,000 |
| Heat released | 12,500,000 |
| Fuel efficiency, percent | 80.0 |
| Process stream convection absorption | 2,500,000 |
| Process stream radiant absorption | 7,500,000 |

Example II

| | |
|---|---|
| Process stream heat absorption | 10,000,000 |
| Furnace heat loss | 300,000 |
| Heat released | 13,000,000 |
| Fuel efficiency, percent | 77.0 |
| Combustion air preheat coil | 1,000,000 |
| Convection coil | 2,550,000 |
| Radiant coil | 7,450,000 |

Examples IV and V

| | |
|---|---|
| Process stream heat absorption | 10,000,000 |
| Furnace heat loss | 300,000 |
| Heat released | 11,800,000 |
| Fuel efficiency, percent | 84.7 |
| Combustion air preheat coil | 950,000 |
| Downstream convection coil | 950,000 |
| Upstream convection coil | 2,260,000 |
| Radiant coil | 7,740,000 |

Example VI

| | |
|---|---|
| Process stream preheat coil | 10,000,000 |
| Furnace heat loss | 300,000 |
| Heat released | 11,800,000 |
| Fuel efficiency, percent | 84.7 |
| Combustion air preheat coil | 950,000 |
| Downstream convection coil | 950,000 |
| Upstream convection coil | 2,260,000 |
| Radiant coil | 7,740,000 |

Example VII-A

| | |
|---|---|
| Process stream heat absorption | 10,000,000 |
| Auxiliary stream heat absorption | 100,000 |
| Furnace heat loss | 300,000 |
| Heat released | 12,500,000 |
| Fuel efficiency, percent | 80.8 |
| Process stream convection heat absorption | 2,500,000 |
| Process stream radiant heat absorption | 7,500,000 |
| Auxiliary stream convection heat absorption | 100,000 |

Example VII-B

| | |
|---|---|
| Process stream heat absorption | 10,000,000 |
| Auxiliary stream heat absorption (net) | 100,000 |
| Furnace heat loss | 300,000 |
| Heat released | 12,020,000 |
| Fuel efficiency, percent | 83.9 |
| Process stream convection heat absorption | 2,400,000 |
| Process stream radiant heat absorption | 7,600,000 |
| Combustion air preheat coil | 400,000 |
| Auxiliary stream convection heat absorption | 500,000 |

Example VIII

| | |
|---|---|
| Process stream heat absorption | 10,000,000 |
| Auxiliary stream heat absorption (net) | 400,000 |
| Furnace heat loss | 300,000 |
| Heat released | 12,020,000 |
| Fuel efficiency, percent | 86.4 |
| Auxiliary stream first convection coil heat absorption | 400,000 |
| Combustion air preheat coil heat absorption | 400,000 |
| Auxiliary stream second convection coil heat absorption | 400,000 |
| Process stream convection heat absorption | 2,400,000 |
| Process stream radiant heat absorption | 7,600,000 |

Example IX

| | |
|---|---|
| Process stream heat absorption | 10,000,000 |
| Steam coil heat absorption (net) | 1,780,000 |
| Furnace heat loss | 330,000 |
| Heat released | 14,740,000 |
| Fuel efficiency, percent | 80.0 |
| Combustion air preheat coil heat absorption | 1,190,000 |
| Convection steam generation heat absorption | 2,970,000 |
| Process stream radiant heat absorption | 10,000,000 |

Example X

| | |
|---|---|
| Process stream heat absorption | 52,000,000 |
| Furnace heat loss | 2,000,000 |
| Heat released | 70,000,000 |
| Fuel efficiency, percent | 74.3 |
| First convection preheat coil heat absorption | 14,000,000 |
| Combustion air preheat coil heat absorption | 10,000,000 |
| Second convection preheat coil heat absorption | 12,000,000 |
| Radiant heat absorption | 40,000,000 |
| Process stream average specific heat in convection section | 0.50 |

These examples are intended to be illustrative of the various applications of the underlying invention here disclosed. With different conditions and/or design choices much higher efficiency boosts can be achieved both for the furnaces themselves as well as for overall plant performances. The foregoing examples are in no way intended to be limiting.

It will be apparent to those skilled in furnace design that wide deviations may be made from the shown embodiments without departing from the main theme of invention set forth in the following claims.

What is claimed is:

1. In a furnace for heating a fluid hydrocarbon and including a radiant section and a convection section with non-contact radiant and convection heat transfer coils and at least one burner which fires fuel with combustion air for introduction of hot combustion gases to the radiant section and for subsequent exit of the combustion gases via the convection section, a method for heating a stream of the hydrocarbon which is available at an elevated temperature and comprising the steps of dividing the stream into a process stream and an auxiliary stream with the process stream larger than the auxiliary stream, circulating the process stream through the radiant coil for collection of heat from the combustion gases, circulating the auxiliary stream in non-contact heat exchange relationship with the combustion air for donation of heat thereto, circulating the auxiliary stream through the convection coil for collection of heat from the combustion products.

2. The method of claim 1 and merging the auxiliary stream with the process stream to form a product stream.

3. The method of claim 2 and providing two portions of the convection coil each in parallel flow relationship to each other and comprising an upstream portion and a downstream portion arranged relative the flow of combustion gases through the convection section, circulating the process stream through the upstream portion before its circulation through the radiant coil, circulating the auxiliary stream through the downstream portion for maximum heat collection from the combustion gases.

4. The method of claim 3 and merging the auxiliary stream with the process stream after the process stream leaves the radiant coil.

5. In a furnace for use in a relatively high temperature endothermal reaction of a fluid hydrocarbon and wherein the furnace includes a radiant section as well as a convection section and with non-contact radiant and convection heat transfer coils respectively therein and at least one burner which fires fuel with combustion air for introduction of hot combustion gases to the radiant section and with subsequent exit of the combustion gases via the convection section, a method for preheating the combustion air and comprising the steps of defining a process stream of the hydrocarbon, circulating the process stream through the convection coil for heat collection, circulating the process stream in non-contact heat exchange relationship with the combustion air for heat donation thereto, circulating the process stream through the radiant coil for reaction therein.

6. The method of claim 5 and providing two portions of the convection coil each in parallel flow relationship to each other and comprising an upstream portion and a downstream portion arranged relative the flow of combustion gases through the convection section, circulating the process stream through the downstream coil, returning the process stream for circulation in the upstream coil for additional heat collection from the combustion gases.

7. A furnace for heating a fluid hydrocarbon and including a burner organized to fire fuel with combustion air to introduce hot combustion gases into the furnace and including vent means for the exit of combustion gases from the furnace and including a first and a second non-contact heat transfer coil with the second coil adjacent the vent means, and comprising:

means for forming a process stream of the hydrocarbon and an auxiliary stream of the hydrocarbon with the auxiliary stream substantially above ambient temperature, means for circulating the process stream through the first coil for heat collection from the combustion gases, means for circulating the auxiliary stream in non-contact heat exchange relationship with the combustion air for donating heat thereto, means for circulating the auxiliary stream through the second coil for collection of heat from the combustion gases.

8. The furnace of claim 7 and means for merging the auxiliary stream with the process stream to form a product stream.

9. A furnace for heating a fluid hydrocarbon and including a radiant section and a convection section with non-contact radiant and convection heat transfer coils and including at least one burner organized to fire fuel with combustion air for introduction of hot combustion gases to the radiant section and for subsequent exit of the combustion gases via the convection section, and comprising:

means for dividing a stream of the hydrocarbon into a process stream and an auxiliary stream with the process stream larger than the auxiliary stream, means for circulating the process stream through the radiant coil for collection of heat from the combustion gases, means for circulating the auxiliary stream in non-contact heat exchange relationship with the combustion air for donation of heat thereto, means for circulating the auxiliary stream through the convection coil for collection of heat from the combustion products.

10. The furnace of claim 9 and means for merging the auxiliary stream with the process stream to form a product stream.

11. The furnace of claim 10 and the convection coil including two portions each in parallel flow relationship to each other and comprising an upstream portion and a downstream portion arranged relative the flow of combustion gases through the convection section, means for circulating the process stream through the upstream portion before its circulation through the radiant coil, means for circulating the auxiliary stream through the downstream portion for maximum heat collection from the combustion gases.

References Cited

UNITED STATES PATENTS

| 2,681,047 | 6/1954 | Dalin et al. | 122—1 |
| 2,762,201 | 9/1956 | Sampson | 122—1 |
| 2,699,758 | 1/1955 | Dalin | 122—1 |

FOREIGN PATENTS

| 894,263 | 3/1944 | France. |
| 927,870 | 3/1947 | France. |
| 1,026,190 | 2/1953 | France. |
| 636,923 | 5/1950 | Great Britain. |

KENNETH W. SPRAGUE, *Primary Examiner.*

U.S. Cl. X.R.

122—356